US010491685B2

(12) United States Patent
Khayrudinov et al.

(10) Patent No.: US 10,491,685 B2
(45) Date of Patent: Nov. 26, 2019

(54) SESSION TRANSFER BETWEEN RESOURCES

(71) Applicant: Microsoft Technology Licensing, LLC, Redmond, WA (US)

(72) Inventors: Anton Khayrudinov, Redmond, WA (US); Sergei Osobov, Redmond, WA (US); Adrian Potra, Redmond, WA (US); Hugh Alexander Prosser Eland, Prague (CZ)

(73) Assignee: Microsoft Technology Licensing, LLC, Redmond, VA (US)

( * ) Notice: Subject to any disclaimer, the term of this patent is extended or adjusted under 35 U.S.C. 154(b) by 477 days.

(21) Appl. No.: 14/675,089

(22) Filed: Mar. 31, 2015

(65) Prior Publication Data
US 2016/0294954 A1 Oct. 6, 2016

(51) Int. Cl.
| | |
|---|---|
| *H04L 29/06* | (2006.01) |
| *H04L 29/08* | (2006.01) |
| *G06F 9/46* | (2006.01) |
| *G06Q 10/10* | (2012.01) |

(52) U.S. Cl.
CPC ........... *H04L 67/148* (2013.01); *G06F 9/461* (2013.01); *G06Q 10/10* (2013.01); *H04L 29/06319* (2013.01); *H04L 65/1083* (2013.01); *H04L 67/02* (2013.01); *H04L 67/142* (2013.01)

(58) Field of Classification Search
CPC ......... H04L 12/1813–1831; H04L 67/14–148
See application file for complete search history.

(56) References Cited

U.S. PATENT DOCUMENTS

| | | | |
|---|---|---|---|
| 6,564,246 B1 | 5/2003 | Varma et al. | |
| 6,871,213 B1 | 3/2005 | Graham et al. | |
| 7,467,349 B1* | 12/2008 | Bryar | G06F 17/30905 |
| | | | 715/200 |

(Continued)

OTHER PUBLICATIONS

Surana, et al. "Introducing IBM LotusLive Engage," 2009.*

(Continued)

*Primary Examiner* — Emmanuel L Moise
*Assistant Examiner* — Julian Chang
(74) *Attorney, Agent, or Firm* — Schwegman Lundberg & Woessner, P.A.

(57) ABSTRACT

Techniques for session transfer between resources are described in which session data for communication sessions is transferred between distinct web-based resources to enable continuation of the communication sessions as navigation between the resources occurs. In one approach, shared session storage accessible to authorized resources is employed to facilitate the transfer of session data. Code embedded in pages for different resources rendered by a browser (or other communication module) operates to store session data for communication sessions in the shared storage. When navigation occurs between different pages, authorizations of the different resources to utilize the shared session storage are determined and communication sessions that are active are maintained across page reloads for the authorized resources. This involves retrieving session data stored in the shared session storage and passing the session data that is retrieved to a communication service to reconnect to the communication sessions after navigation occurs.

19 Claims, 6 Drawing Sheets

(56) References Cited

U.S. PATENT DOCUMENTS

| | | | |
|---|---|---|---|
| 7,861,176 B2 | 12/2010 | Weisberg | |
| 7,877,445 B2 | 1/2011 | Komine et al. | |
| 8,312,081 B2 | 11/2012 | Yuan et al. | |
| 8,484,216 B2 | 7/2013 | Berry et al. | |
| 8,484,569 B2 | 7/2013 | Carlson et al. | |
| 8,621,091 B1* | 12/2013 | Akalin | G06F 17/30283 709/220 |
| 8,745,390 B1* | 6/2014 | Atwood | H04L 63/061 713/169 |
| 9,507,651 B2* | 11/2016 | McDonald | G06F 9/543 |
| 9,705,864 B2* | 7/2017 | Wang | H04L 63/08 |
| 9,722,972 B2* | 8/2017 | Ahmed | H04L 63/0281 |
| 2004/0085366 A1* | 5/2004 | Foster | G06F 17/30899 715/854 |
| 2004/0193699 A1* | 9/2004 | Heymann | G06F 17/30873 709/218 |
| 2005/0138122 A1 | 6/2005 | Boehringer et al. | |
| 2005/0204148 A1* | 9/2005 | Mayo | H04L 63/0815 713/185 |
| 2005/0273714 A1 | 12/2005 | Beartusk et al. | |
| 2006/0104306 A1* | 5/2006 | Adamczyk | H04L 67/24 370/466 |
| 2006/0136592 A1* | 6/2006 | Heymann | G06F 17/30876 709/227 |
| 2006/0248350 A1* | 11/2006 | Stanev | G06Q 20/3829 713/189 |
| 2008/0189365 A1 | 8/2008 | Narayanaswami et al. | |
| 2009/0024737 A1* | 1/2009 | Goldspink | G06F 11/3495 709/224 |
| 2009/0024748 A1* | 1/2009 | Goldspink | G06F 17/3089 709/228 |
| 2009/0052441 A1* | 2/2009 | Buckley | H04W 76/022 370/355 |
| 2009/0158163 A1 | 6/2009 | Stephens et al. | |
| 2009/0282423 A1* | 11/2009 | Smith | G06F 17/30893 719/328 |
| 2010/0057829 A1* | 3/2010 | Sedlacek | H04L 67/1008 709/202 |
| 2010/0306066 A1* | 12/2010 | Binnewies | G06Q 30/02 705/14.73 |
| 2011/0185288 A1* | 7/2011 | Gupta | G06Q 10/10 715/752 |
| 2011/0314389 A1* | 12/2011 | Meredith | G06F 8/60 715/751 |
| 2012/0210243 A1 | 8/2012 | Uhma et al. | |
| 2013/0007845 A1* | 1/2013 | Chang | G06F 21/62 726/4 |
| 2013/0014243 A1* | 1/2013 | Chen | H04L 67/2804 726/8 |
| 2013/0227291 A1* | 8/2013 | Ahmed | H04L 63/0281 713/171 |
| 2013/0311286 A1* | 11/2013 | Detwiler | G06Q 30/0255 705/14.54 |
| 2014/0026081 A1* | 1/2014 | O'donnell | G06F 17/30699 715/760 |
| 2014/0101446 A1* | 4/2014 | Lekies | H04L 9/3226 713/169 |
| 2014/0173415 A1* | 6/2014 | Kattil Cherian | G06F 17/30861 715/234 |
| 2014/0222894 A1* | 8/2014 | Gangadharan | H04L 67/02 709/203 |
| 2014/0267339 A1* | 9/2014 | Dowd | H04L 63/0428 345/581 |
| 2014/0280755 A1* | 9/2014 | Memon | H04L 67/02 709/219 |
| 2014/0324943 A1* | 10/2014 | Antipa | H04L 67/42 709/203 |
| 2015/0081876 A1* | 3/2015 | Pieczul | G06F 11/36 709/224 |
| 2015/0089614 A1* | 3/2015 | Mathew | H04L 67/141 726/7 |
| 2015/0106870 A1* | 4/2015 | Li | H04L 63/1425 726/1 |
| 2015/0262199 A1* | 9/2015 | Taylor | G06F 17/30867 705/7.29 |
| 2015/0302456 A1* | 10/2015 | Rego | G06Q 30/0235 705/14.35 |
| 2016/0044083 A1* | 2/2016 | Galloway | H04L 67/32 709/217 |
| 2016/0173464 A1* | 6/2016 | Wang | H04L 61/2589 713/171 |
| 2016/0197962 A1* | 7/2016 | Winn | H04L 63/20 713/168 |
| 2016/0330164 A1* | 11/2016 | Bellan | H04L 51/36 |
| 2016/0373693 A1* | 12/2016 | Segal | H04N 7/15 |
| 2017/0063615 A1* | 3/2017 | Yang | H04L 41/0806 |

OTHER PUBLICATIONS

Maskalik, Sergey, "Cross Domain Communication and Data Storage With localStorage and postMessage," available as early as 2012, copy provided was archived by archive.org in 2014.*

"International Search Report & Written Opinion Issued in PCT Application No. PCT/US2016/024602", dated Jun. 9, 2016, 10 Pages.

"SecondWritten Opinion Issued in PCT Application No. PCT/US2016/024602", dated Feb. 23, 2017, 6 Pages.

"Restore Chat", Retrieved From: <http://docs.genesys.com/Documentation/GWE/latest/API/RestoreChat> Feb. 24, 2015, Dec. 5, 2014, 2 pages.

"Restoring Chat Sessions", Retrieved From: <http://genesyslab.info/wiki/index.php?title=Restoring_Chat_Sessions> Feb. 24, 2015, Nov. 13, 2012, 1 page.

Lindback,"Websockets: Restore Session on Page Reloading", Retrieved From: <http://stackoverflow.com/questions/21782233/websockets-restore-session-on-page-reloading> Feb. 24, 2015, Feb. 14, 2014, 1 page.

Shastry,"Same Time Chat—Session Restoring", Retrieved From: <http://ideajam.net/ideajam/p/ij.nsf/0/ED9D4036779342F68625761F001C9C66> Feb. 24, 2015, Aug. 27, 2009, 2 pages.

Strahl,"Using HTML 5 SessionState to save rendered Page Content", Retrieved From: <http://weblog.west-wind.com/posts/2013/Jul/01/Using-HTML-5-SessionState-to-save-rendered-Page-Content> Feb. 24, 2015, Jul. 1, 2013, 10 pages.

"International Preliminary Report on Patentability", Application No. PCT/US2016/024602, dated May 24, 2017, 7 pages.

* cited by examiner

SESSION TRANSFER BETWEEN RESOURCES

BACKGROUND

Users are increasingly relying upon web-based resources for conducting business and personal communications including online meetings, screen-sharing, video chats, messaging, and otherwise collaborating via the Internet. Some web-based resources enable communication sessions through a service in connection with underlying functionality. For example, a document editing application provided as a web service can incorporate built-in functionality for users to collaborate on editing a document and engage in instant messaging, video chats, screen sharing and other communication sessions. Conventionally, applications and web services that support communication session integration do so on an individual basis and/or use different services and techniques. Consequently, communications sessions are limited to a particular application used to establish the session and disconnection occurs when navigation occurs between separate web-based resources. In order to collaborate across different web-based resources, a user is forced to set-up a new session each time the user switches to a different web-based resource. Thus, existing techniques provide limited ability for continuation of communication sessions across resources and involve considerable manual preparation to set-up the sessions.

SUMMARY

Techniques for session transfer between resources are described in which session data for communication sessions is transferred between distinct web-based resources to enable continuation of the communication sessions as navigation between the resources occurs. In one approach, shared session storage accessible to authorized resources is employed to facilitate the transfer of session data. Code embedded in pages for different resources rendered by a browser (or other communication module) operates to store session data for communication sessions in the shared storage. When navigation occurs between different pages, authorizations of the different resources to utilize the shared session storage are determined and communication sessions that are active are maintained across page reloads for the authorized resources. This involves retrieving session data stored in the shared session storage and passing the session data that is retrieved to a communication service to reconnect to the communication sessions after navigation occurs.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the following discussion.

DETAILED DESCRIPTION

Overview

Figure 1:
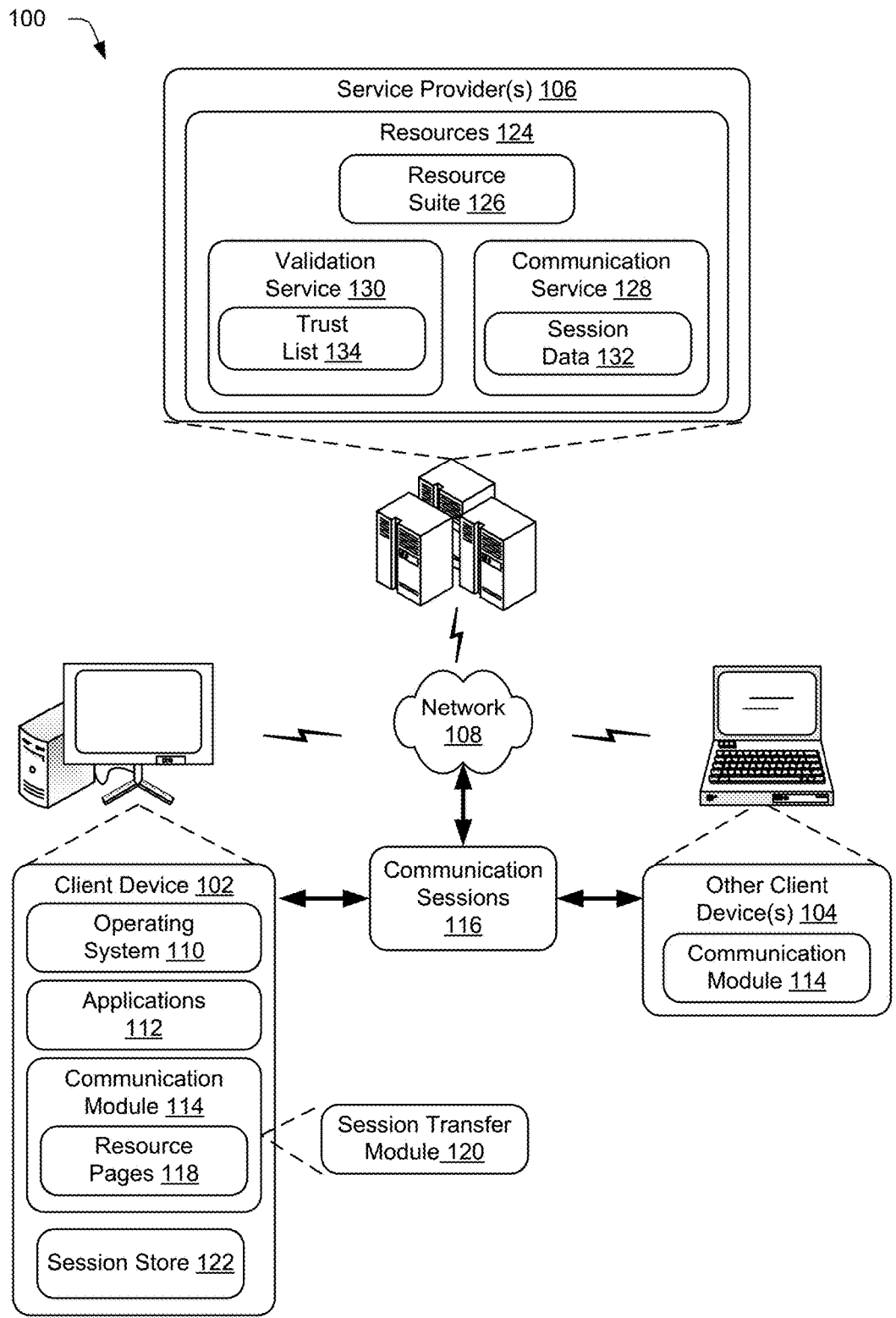
FIG. 1 is an illustration of an example operating environment that is operable to employ techniques for session transfer between resources.

Conventionally, applications and web services that support communication session integration do so on an individual basis and/or use different services and techniques. Consequently, existing techniques provide limited ability for continuation of communication sessions across resources and may require considerable manual preparation to set-up individual sessions as a user interacts with different resources.

Techniques for session transfer between resources are described in which session data for communication sessions is transferred between distinct web-based resources to enable continuation of the communication sessions as navigation between the resources occurs. In one approach, shared session storage accessible to authorized resources is employed to facilitate the transfer of session data. Code embedded in pages for different resources rendered by a browser (or other communication module) operates to store session data for communication sessions in the shared storage. When navigation occurs between different pages, authorizations of the different resources to utilize the shared session storage are determined and communication sessions that are active are maintained across page reloads for the authorized resources. This involves retrieving session data stored in the shared session storage and passing the session data that is retrieved to a communication service to reconnect to the communication sessions after navigation occurs.

The techniques for session transfer between resources described herein provide seamless transfer and continuation of communication sessions across distinct resources, such as pages associated with different web-applications of an application suite. Shared session storage is used to enable trusted resources to exchange session data and maintain a session, even for resources that are provided via separate and distinct pages, domains, and/or providers. For example, an on-going chat regarding documents for a project multiple participants are collaborating on using a document editor application is automatically transferred and continued when a switch is made to an email application to review a related communication or pull-up another document. Since, users do not have to manually set-up different sessions each time the user navigates to access a different page and/or resource, the process is efficient and does not significantly interrupt an on-going collaboration. Additionally, network traffic is reduced since transactions to set-up new sessions occur less frequently when users are able to continue existing sessions while navigating between different resources.

In the following discussion, an example environment is first described that may employ the techniques described herein. Example details and procedures are then described which may be implemented in the example environment as well as other environments. Consequently, the example details and procedures are not limited to the example environment and the example environment is not limited to the example details and procedures. Lastly, an example system and components of the system are discussed that may be employed to implement aspects of the techniques described herein.

Example Environment

FIG. 1 is an illustration of an environment 100 in an example implementation that is operable to employ techniques described herein. The illustrated environment 100 includes a client device 102, an other client device 104, and a service provider 106 that are communicatively coupled via a network 108. The client device 102, other client device 104, and service provider 106 may be implemented by one or more computing devices and also may be representative of one or more entities.

A computing device may be configured in a variety of ways. For example, a computing device may be configured as a computer that is capable of communicating over the network 108, such as a desktop computer, a mobile station, an entertainment appliance, a set-top box communicatively coupled to a display device, a wireless phone, a game console, and so forth. Thus, the computing device may range from full resource devices with substantial memory and processor resources (e.g., personal computers, game consoles) to a low-resource device with limited memory and/or processing resources (e.g., traditional set-top boxes, handheld game consoles). Additionally, although a single computing device is shown in some instances, the computing device may be representative of a plurality of different devices, such as multiple servers of the service provider 106 utilized by a business to perform operations, and so on. Further examples of computing systems and devices suitable to implement techniques described herein are described below in relation to FIG. 10.

Although the network 108 is illustrated as the Internet, the network may assume a wide variety of configurations. For example, the network 108 may include a wide area network (WAN), a local area network (LAN), a wireless network, a public telephone network, an intranet, a peer-to-peer network, and so on. Further, although a single network 108 is shown, the network 108 may be configured to include multiple networks.

The client device 102 is further illustrated as including an operating system 110. The operating system 110 is configured to abstract underlying functionality of the underlying device to applications 112 that are executable on the client device 102. For example, the operating system 110 may abstract processing, memory, network, and/or display functionality such that the applications 112 may be written without knowing "how" this underlying functionality is implemented. The application 112, for instance, may provide data to the operating system 110 to be rendered and displayed by a display device as illustrated without understanding how this rendering will be performed. A variety of applications 112 typically associated with client devices are contemplated including, but not limited to, a productivity suite that integrates multiple office productivity modules, a web browser, games, a multi-media player, a word processor, a spreadsheet program, a photo manager, and so forth.

The client device 102 and other client device 104 are each illustrated as including a communication module 114. The communication modules are representative of functionality to enable various kinds of communications via the network 108. Examples of the communication modules include a browser to access web content, a voice communication application (e.g., a VoIP client), a video communication application, an instant messaging application, a content sharing application, and combinations thereof. The communication module 114 for instance, enables different communication modalities to be combined to provide diverse communication scenarios. This includes but is not limited to implementing integrated functionality for web browsing, user presence indications, video communications, online collaboration and meeting experiences, instant messaging (IM), and voice calling. Further, the communication module may be operable to access online resources (e.g., content and services), browse web pages and sites, establish communication connections with service providers and other clients, and so forth. In at least some implementations, the communication module 114 represents an application that is deployed to and installed locally on a client device. Additionally or alternatively, the communication module 114 may be implemented all or in part as a remote application that is accessed and executed via a web browser (e.g., a web application), as a remote service from a provider, using peer-to-peer techniques, and so forth.

In accordance with techniques described herein, the communication module 114 may be used to establish communication sessions 116 between endpoints such as between a service provider and one or more clients and/or directly between clients. For example, communication sessions 116 may enable exchange of various messages, media streams (e.g., audio/video), content, and so forth between endpoints as represented in FIG. 1. In one or implementations, communication sessions 116 represent web-based real-time communication that occurs using communication modules 114 that may be configured as web browsers, cloud-based web applications, client applications, or otherwise.

In addition to enabling communication sessions 116, the communication module 114 is operable to implement functionality for web browsing to search, locate, access, download, render and otherwise interact with resource pages 118. Resource pages 118 represent various documents and pages that are typically available from providers over a network for rendering by a web browser. Resource pages 118 can also include local files and resources. Resource pages 118 represent mark-up language documents that are configured using XML, HTML, script, stylesheets, images, and so forth.

Additionally, the communication module 114 may include or make use of a session transfer module 120 configured to implement aspects of techniques for session transfer between resources as described herein. For example, the session transfer module 120 represents functionality operable to obtain and store data related to communication sessions 114 in a session store 122. As discussed in detail herein, the session transfer module 120 and the session store 122 provide a mechanism to transfer session data between authorized resources, and thereby continue corresponding communication sessions as navigation occurs to different resources. The session store 122 as illustrated represents local storage that can be utilized to securely store and control access to session related data. In addition or alternatively, the session store 122 may be configured as remote storage that is associated with the client device 102 and/or a user account. The remote storage approach may be employed to support roaming of the communication sessions between different devices that are authenticated to a user account. For example, a user may want to transfer the session between a laptop computer and a mobile phone device in some interaction scenarios.

The session transfer module 120 may be implemented in any suitable way. For example, the session transfer module 120 may be implemented as a component of another application, such as being an integrated component of a browser or other communication module 114. In addition or alternatively, the session transfer module 120 may be provided as a standalone module that various applications 112 can take advantage of to transfer communication sessions 116 as described herein. In another example approach, the session transfer module 120 represents functionality implemented by code/script embedded within resource pages 118. For instance, a designated container or frame of a page may be configured to implement functionality that is described in relation to the session transfer module 120.

The service provider 106 as depicted in FIG. 1 includes functionality operable to manage various resources 124 that may be made available over the network 108. For example, service provider 106 may provide various resources 124 via webpages (e.g., resource pages 118) or other user interfaces that are communicated over the network for output by one or more clients via a web browser or other client application. The service provider 106 is configured to manage access to the resources 124, performance of the resources, and configuration of user interfaces to provide the resources 124, and so on. The service provider 106 may represent one or more server devices used to provide the various resources 124.

Generally, resources 124 made accessible by a service provider 106 may include any suitable combination of services and/or content typically made available over a network by one or more providers. Some examples of services include, but are not limited to, a search service, an email service, an instant messaging service, an online productivity suite, and an authentication service to control access of clients to the resources 124. Content may include various combinations of text, multi-media streams, documents, application files, photos, audio/video files animations, images, web pages, web applications, device applications, content for display by a browser or other client application, and the like. Various different resources 124 and services can be provided by the same service provider, by one or multiple services, and/or via multiple different service providers.

Additional example resources 124 represented in FIG. 1 include a resource suite 126, a communication service 128, and a validation service 130. The resource suite 126 represents a group of related resources, such as group of web-applications packaged together by a provider. Generally, the different resources in the resource suite 126 provide separate and distinct functionality and are provided via different domains and pages. However, the suite may be marketed as a group and providers may enable combined access and/or subscriptions to multiple resources as a package. Suites may group services and functionality that relate to common categories such as a business/office productivity suite, a desktop application suite, an image editing suite, a gaming suite, a developer suite, and so further. Specific examples of suites include but are not limited to Microsoft® Office 365 and Google Docs™.

The communication service 128 is representative of a service to perform various tasks for management of communications sessions 116 and interactions between the client device 102 and other client device 104. The communication service 128, for instance, may be operable to manage initiation, moderation, and termination of communication sessions 116 for the clients. The communication service 128 may integrate functionality for one or more of VoIP calls, online meeting and conferencing, screen sharing, a unified communications and collaboration (UC&C) service, instant messaging, video chats, and so forth. The communication service 128 may also be implemented as or be connected to a private branch exchange (PBX) in communication with a Public Switched Telephone Network ("PSTN") to enable voice communication between the client terminal and other devices.

In connection with sessions, the communication service 128 also generates session data 132 that defines the sessions and enable clients to connect to the sessions. As part of establishing communication sessions, the communication service 128 communicates various session data 132 to clients to facilitate set-up of the sessions by a browser or other communication module 114. Thus, the session data 132 represents various parameters used to setup communication sessions via the communication service 114 including but not limited to one or more of a user identifier, session identifier, identification of client endpoints for the communication session, a session URL, or session security credentials.

The validation service 130 represent functionality operable to validate resources with respect to sharing of session data 132 between the resources. In one or more implementations, the validation service 130 is configured to define and enforce a trust policy for session transfers. For example, the validation service 130 may include a trust list 134 configured to distinguish between resources that are authorized and not authorized to access a shared session store 122. Authorizations reflected by the trust list 134 may be associated with resources on an individual basis. Additionally, authorizations may be client device specific and/or user account specific. The trust list 134 may be configured in various ways to indicate distinctions between resources. In one approach, the trust list 134 is configured as a whitelist that identifies authorized resources. Alternatively, the trust list 134 may be configured as a block list that indicates resources that are not authorized, and therefore a blocked from accessing shared session storage 122. The trust list 134 may also be configured as a database exposed to clients to enable lookup of authorizations for corresponding resources.

Generally, validating resources involves checking the resources against the trust list 134 to ascertain corresponding authorizations to access the session store. In one or more implementation, the validation service 130 may be configured to supply a complete trust list 134 to client devices to enable authorization determinations at the clients, such as by operation of the session transfer module 120. In another approach clients can send queries regarding resources to the validation service 130, which provides indications regarding corresponding authorizations back to the clients in response to the queries. Additional details regarding these and other aspects of session transfer between resources are described in relation to the following figures.

Having considered the foregoing example environment, consider now a discussion of some further details, examples, and procedures for in accordance with one or more implementations.

Example Session Transfer Details

To further illustrate techniques that may be employed to transfer session between resources, consider now a discussion of some example details, scenarios, and procedures that are depicted in FIGS. 2-5. In general, functionality, features, and concepts described in relation to the examples above and below may be employed in the context of the example procedures described later in this document. Further, functionality, features, and concepts described in relation to different figures and examples in this document may be interchanged among one another and are not limited to implementation in the context of a particular figure or procedure. Moreover, blocks associated with different representative operations, procedures, and individual figures herein may be applied together and/or combined in different ways. Thus, individual functionality, features, and concepts described in relation to different example environments, devices, components, and procedures herein may be used in any suitable combinations and are not limited to the particular combinations represented by the enumerated examples in this description.

Example Scenario

Figure 2:
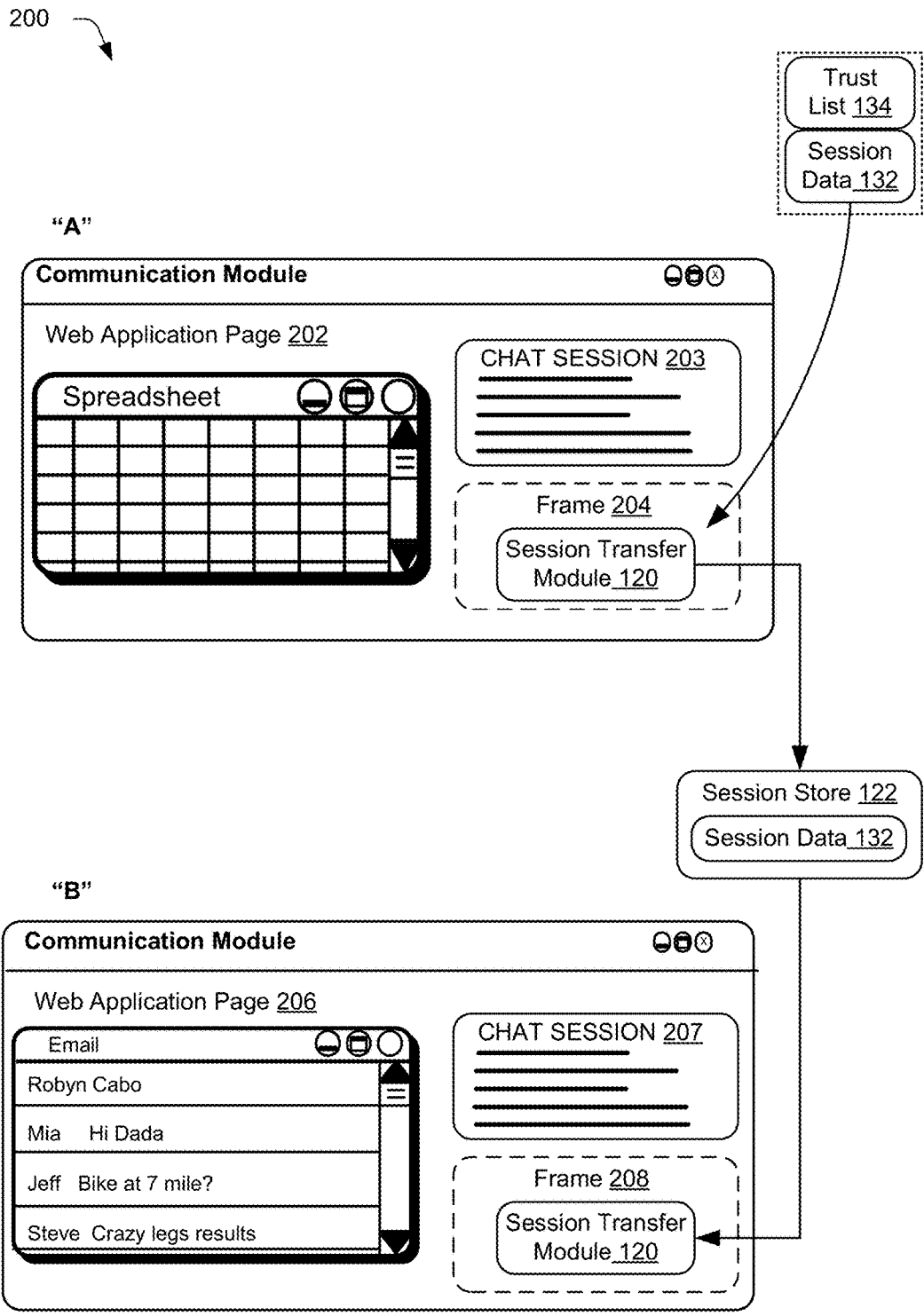
FIG. 2 depicts an example scenario illustrating details of continuing a session as navigation occurs across resources in accordance with one or more implementations.

FIG. 2 depicts generally at 200 an example scenario illustrating details of continuing a session as navigation occurs across resources in accordance with one or more implementations. In the depicted example, a view "A" shows an example interface for a communication module 114 in which a web application page 202 for a first resource is rendered. In this example, the resource 124 is represented as a spreadsheet application that is available from a service provider 106 as part of resource suite 126 as noted previously. The web application page 202 may be accessed over a network from the service provider 106 using a suitable communication module 114, such as a browser. The web application page 202 is additionally configured to support communication session functionality in connection with underlying application functionality of the application. For example, a chat session (or other communication session 116) can be initiated through a communication service 128 from directly within the web application page 202 for the spreadsheet application as represented by the chat session element 203 in FIG. 2.

The example web application page 202 additionally includes functionality to support transfer of sessions between resources in the manner described herein. In particular, the web application page 202 can be configured to include embedded script/code operable to initiate and/or perform operations described herein in relation to session transfer module 120. Such operations may include but are not limited to obtaining session data 132 through interaction with a communication service 128, storing the session data in session store 122 when appropriate, accessing the session store 122 to obtain session data when the page is loaded/reloaded, utilizing the session data to connect/reconnect to an existing active session with the communication service 128, and so forth. Operations may further include accessing and utilizing a trust list 134 or comparable trust assertions to determine authorizations of resources 124 with respect to session data 132 stored in a session store 122. Thus, the script/code is operable to effectuate storage and transfer of session data for the transfer of communication sessions using shared session storage.

In the example of FIG. 2, functionality of the session transfer module 120 is implemented via a frame 204 of the web application page 202. The frame 204 represent a suitable element or container within a page that is configured to access content from an external source that is different than a domain for the page. In other words, the sources of main content for the page and content of the frame correspond to different domains, websites, and/or URLs. In accordance with techniques described herein the frame 204 may be a hidden frame (e.g., non-visible page element) that implements operations for session transfer including interactions with one or more services to get the session data and the trust list, establish session connections, validate resources, and so forth. The frame 204 may be a sandboxed portion that cannot be modified by external code. Frames as described herein may comprise in-line frames (e.g., iframes) that are configured to enable inclusion of content from external sources in the pages. Different portions of a page may correspond to different iframes. For example, the main page content, chat session, and session transfer module may be implemented via different corresponding iframes for the page. Other configurations of frames are also contemplated.

When a page such as the example web application page 202 is loaded, the session transfer module 120 operates to access the session store 122 to get session data for an active session if available. Then, the web application page 202 can be connected to the existing session. For example, messages for an ongoing chat session can be exposed via the chat session element 203. In this manner, communication functionality of a page that supports collaborations across different resources is configured to continue an active session when appropriate session data is available.

Additionally, when a communication session is initially established via a page, the session transfer module 120 operates to obtain corresponding session data 132 through interaction with a service and store the session data via the session store 132. Storage of the session data 132 may be performed in dependence upon validation of resources according to authorizations specified by a trust list 134 or otherwise. Validation can prevent hijacking of session by untrusted resources and also avoids storage of data for resources that do not support session transfers.

When navigation occurs between trusted resources, session data 132 from the session store 120 is employed to maintain continuity of communications sessions across the trusted resources. For example, view "B" shows an interface for a communication module 114 following navigation from view A to access a different resource. In particular, a web application page 206 for the different resource is rendered. Here, the resource 124 is represented as an email application that may be included with the spreadsheet application as part of a resource suite. Of course the email application could alternatively be a standalone resource available from the same provider, or even from a different provider that supports then techniques described above and below.

As with the page in view A, the web application page 206 of view B is configured to support communication session functionality and also includes functionality to support transfer of sessions between resources in the manner described herein. Thus, the example web application page 206 includes a chat session element 207 and a respective frame 208. When web application page 206 is loaded, the session transfer module 120 implemented via the frame operates to validate the page for session transfers. This may occur by accessing, referring to, and/or querying a trust list 134 in various ways described herein. As long as the email application is authorized to use the session store 122, the session transfer module 120 retrieves the session data 122. The set-up parameters included with the session data 122 are used to connect the web application page 206 to the active session. This in turn causes configuration of the chat session element 207 to load the chat session engaged in via the page of view A and thereby enable continuation of the chat session via the web application page 206 of view B.

Example Communication Flow

Figure 3:
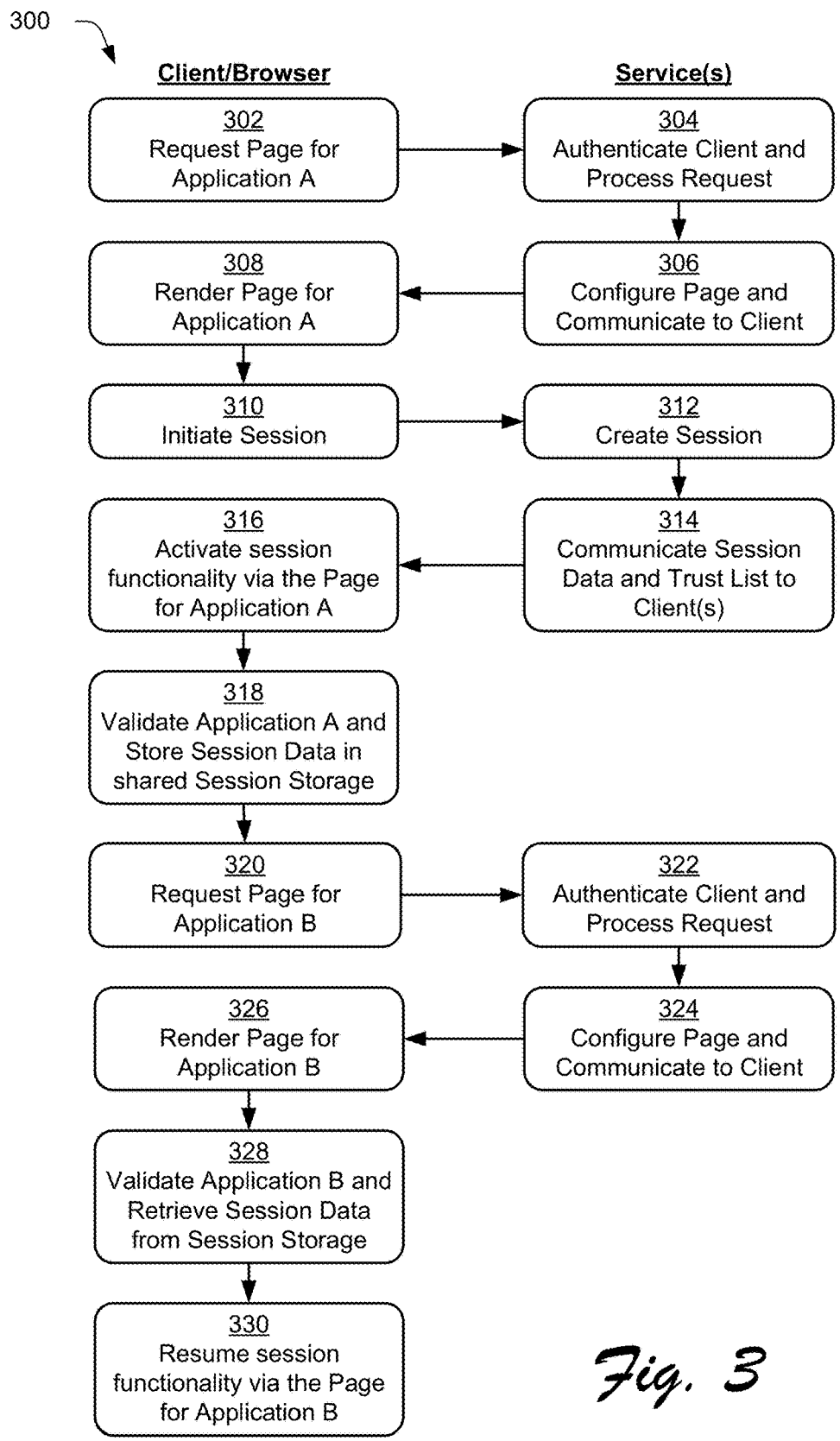
FIG. 3 is a diagram depicting example operations in a communication flow for session transfer between resources in accordance with one or more implementations.

In the context of the forgoing example environment and scenario, FIG. 3 depicts a diagram having a communication flow that takes place between a client/browser and one or more services in a manner that enables the client to continue a communications session across different resources. The communication flow may be implemented utilizing the previously described systems, components, and devices. Aspects of the example operations depicted in the communication flow may be implemented in hardware, firmware, or software, or a combination thereof. The operations are shown as a set of blocks that specify actions performed by one or more devices and are not necessarily limited to the particular orders shown for performing the operations.

The client requests a page for a first application, namely application "A". (block 302). The request may be formed responsive to user input to perform navigation via a browser or other communication module to access resources available from one or more service providers. The service providers may provide various services that expose resources to client and control access to the resources. In response to the request, one or more services operate to authenticate the client and process the request (block 304). For example, an authentication service may verify credentials supplied in the request to determine authorizations of the client to access resources. A resource manager may process the request and route the request to an appropriate service for handling. If the client is successfully authenticated, the page for application A is configured and communicated to the client (block 306). The client then renders the page for application A (block 308) to enable interaction with corresponding functionality of the application.

Application A may support integrated functionality for collaborations as described herein. The functionality (e.g., a chat element, screen sharing window, VOIP call element, or element for another type of collaboration) can be invoked to initiate a session (block 310). This may involve sending a session creation request to a communication service 128 to cause creation of a corresponding session between designated participants associated with respective endpoint client devices.

In response to the session creation request, the communication service creates the session (block 312). Once a session is created, the communication service can operate to communicate session data 132 and/or a trust list 134 to one or more clients (block 314) associated with participants of the session.

For instance, various session data 132 may be created that defines the session and includes set-up parameters to enable clients to connect to the session and/or configure elements of pages to support the communication session. The communication service 114 can also interact with or otherwise make use of a validation service 130 to obtain a trust list 134 or other comparable data indicative of authorizations of resources to transfer sessions one to another. In addition or alternatively, the validation service 130 may be invoked when pages are configured and/or loaded to expose the trust list for use by clients. Clients are able to access and download the trust list, interact with the validation service 130 to make queries regarding resources, or otherwise determine which resources are and are not authorized to use shared session storage.

The client in the continuing example uses the data supplied by the service to activate session functionality via the page for application A (block 316). For example, functionality (such as a chat element) is configured based on session data 132 returned by the communication service to connect to a corresponding session, receive communications/messages for the session, and render a view of session messages. Thus, a user is able to engage in the communication session (chatting, sharing, etc.) in connection with the underlying functionality of application A through the built-in features for collaboration integrated with application A.

Additionally, the client performs operations to facilitate transfer of the session/session data to other resources. In particular, the client validates application A and stores session data in shared session storage (block 318). Validation can occur via a validation service 130 and/or a trust list 134 supplied by the validation service 130 as noted previously. Here, a check is performed before writing data to the shared session storage to ensure that application A is authorized to do so. In the event application A is not authorized, storage may be prevented and consequently the client is unable to transfer the current session to another resource. Assuming application A is authorized, session data is included in shared session storage and is then accessible for use by other authorized resources as navigation occurs between the resources.

Subsequently, a user may choose to interact with a different resource and provide input via the browser to cause navigation to access the resource. For example, selection of a link to a different resource such as application B may be detected by the browser. This cause the client to request a page corresponding to application B (block 320). In response to the request, one or more services may again operate to authenticate the client and process the request (block 322). If the client is successfully authenticated, the page for Application B is configured and communicated to the client (block 324). The page for application B is then rendered by the client (block 326). Doing so effectively disconnects application A from the session since the client/browser is not directed to a different resource, namely application B. However, the session data 132 that has been stored can be utilized to continue the session by reconnecting the client to the session via the page for application B.

In order to do so, the client validates application B and retrieves session data from shared session storage (block 328). Again, validation can occur via a validation service 130 and/or a trust list 134 supplied by the validation service 130 as noted previously. Here, a check is performed to ensure that application B is a trusted resource that is authorized to use the stored session data from the shared storage. In the event that application B is not trusted, the data is inaccessible in which case the session is discontinued and further collaboration via the page for application B would require initiating a new session. Assuming that application B is trusted, session data is retrieved from shared session storage and used to resume session functionality via the page for Application B. For example, the client may form a session connection request that uses set-up parameters extracted from the session data, such as a session ID, session URL, and other suitable data. The session connection request is communicated to the communication service 128 which causes the communication service to reconnect the client to the session via the page for Application B. Traffic and messages for the session are then directed to the page for Application and in particular to communication functionality integrated with the page, such as a chat window, shared screen view, VOIP call element, and so forth.

It should be noted that the process of switching the session between resources in this manner occurs quickly as a page for a new resource is loaded. As such, there is little or no discernable interruption in the ongoing collaboration from the perspective of participants. Additionally, endpoints clients for remote participants connected to the session remain connected to the session during the transfer process that occurs at a different client. The service handles diverting traffic/messages to the correct resources/endpoints once the connection is resumed without changes or disruption to the endpoints client connections. Further details are discussed in relation to the additional procedures that follow.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference may be made to the environment 100 of FIG. 1 and the examples of FIGS. 2-3. For instance, aspects of the procedures may be performed by a suitably configured computing device, such as a client device that includes or otherwise makes use of a communication module 114 and/or a session transfer module 120. Aspects of the procedures may also be performed by one or more server devices, such as a servers associated with a service provider 106 configured to provide various resources 124.

Figure 4:
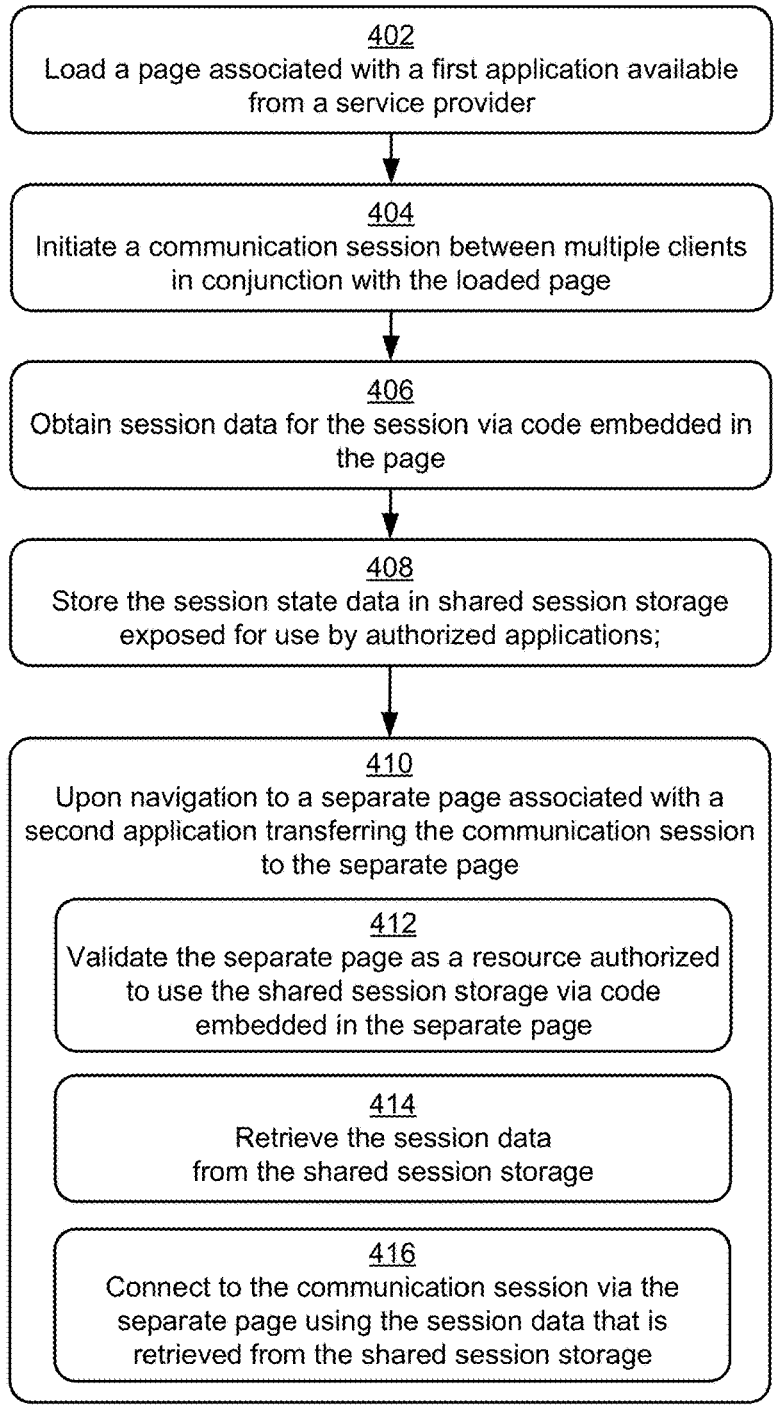
FIG. 4 is a flow diagram depicting an example procedure for transfer of a communication session at a client device in accordance with one or more implementations.

FIG. 4 is a flow diagram depicting an example procedure 400 for transfer of a communication session at a client device in accordance with one or more implementations. A page associated with a first application available from a service provider is loaded (block 402). For example, a communication module 114 can be used to access and interact with various resources 124 available from a service provider 106 as discussed previously. The communication module 114 can be configured as a browser or other suitable application operable to obtain and render resource pages 118 associated with resources. The resources can include a resource suite 126 as well as other pages, content, and services. At least some of the resources can integrate communication functionality to support collaborations along with application functionality, such as chats, instant messaging, screen sharing, collaborative document editing, comments, and so forth.

A communication session is initiated between multiple clients in conjunction with the loaded page (block 404). For example, communication functionality associated with the first application can be invoked to establish as session between participants via a communication service 128. Then, session data for the session is obtained via code embedded in the page (block 406) and the session data is stored in shared session storage exposed for use by authorized resources (block 408).

For example, a session transfer module 120 can operate as described herein to obtain session data for collaboration sessions engaged in by a client. Generally, the session data includes parameters used to setup the communication session via a communication service including one or more of a user identifier, session identifier, identification of client endpoints for the communication session, a session URL, or session security credentials. Session data can be configured in various ways. For example, session data may be created in the form of a binary large object (BLOB) that is communicated from the service to different endpoints associated with a session. The BLOB may be encrypted for secure communication. In another approach, session data may be made accessible via a link, digital token, certificate, or cookie that is provided to the endpoints to enable retrieval of the session data from a corresponding database and/or storage location.

In order to exchange the data between different resources, the session transfer module 120 makes use of a shared session store 122 that is exposed to different trusted resources. The session transfer module 120 can be implemented by code that is embedded within resource pages. In one example, the code is implemented via a frame for the page configured to access content from an external source that is different than a domain for the page. One example of such a frame is an inline frame or iframe. The code within the iframe implements operations to obtain, store, and utilize session data and make use of the session store 122 to exchange the session data between resources.

In one approach, the shared session storage is implemented via local storage associated with the client device. In this case processing for transfer of a session occurs locally and therefore minimizes server client roundtrips (e.g., reduced network traffic). In addition or alternatively, the shared session storage can be implemented via remote storage that enables roaming of the session data between different devices authenticated to an account authorized to access the remote storage. In one or more implementations, access to the session data stored in the shared session storage is controlled based on authentication of the computing device to a user account associated with the session data. In this case, transfers between resources are permitted as long as a client is signed-in to the same user account when using the different resources. If a user account that is different than the user account used to store the data is active, the transfers are restricted.

Upon navigation to a separate page associated with a second application, the communication session is transferred to the separate page (block 410). As noted herein, transfer of the sessions/session data is permitted between a defined set of trusted resources that are configured to enable the transfer. Such resources (examples of which include the first and second application of the example procedure) support collaboration functionality in conjunction with application functionality provided by said applications through communication sessions established via a communication service. In addition, the resources are included in a group of trusted resources authorized to use the shared session storage. In one or more implementation, different resources are included in a suite of multiple resources provided by the service provider. However, the techniques discussed herein can also be applied to separate resources and resources from different providers. Different resources may be implemented via different domains and corresponding pages that are separate and distinct for different resources. As such, security restrictions enforced by the communication module/browser prevent directly continuing sessions across the different domains due to security exposure of allowing such transactions. Using the shared session storage described herein provides a mechanism to safely and securely enable session transfers for trusted resources across the different domains.

In order to effectuate the transfer, the separate page is validated as a resource authorized to use the shared session storage via code embedded in the separate page (block 412). The validation may involve ascertaining whether the separate page is included in a trust list that specifies trusted resources authorized to use the shared session storage. Resources that are not trusted are blocked from using the shared storage and as such the transfer process is secure.

Assuming the separate page is trusted, session data is retrieved from the shared session storage (block 414) and the separate page is connected to the communication session using the session data that is retrieved from the shared session storage (block 416). Connection of the separate page involves extracting the appropriate parameters for the session from the session data. In one approach, data may expire after some period of time so a check may be made to ensure that the session is not stale. If there is an active session indicated by the parameters, a request for connection to the session is formed using the parameters and communicated to the communication service. In response, the communication service operates to reconnect the client to the session though the second applications. For example, the communication service updates an endpoint for the session to correspond to the second application instead of the first application. Then, messages/traffic for the session are redirected to the second application, which enable continuation of the session. In the event that messages and other exchanges for the session occur during a transition period for transfer between resources, the communication service queues those message and sends the queued messages after reconnection to catch back up.

Figure 5:
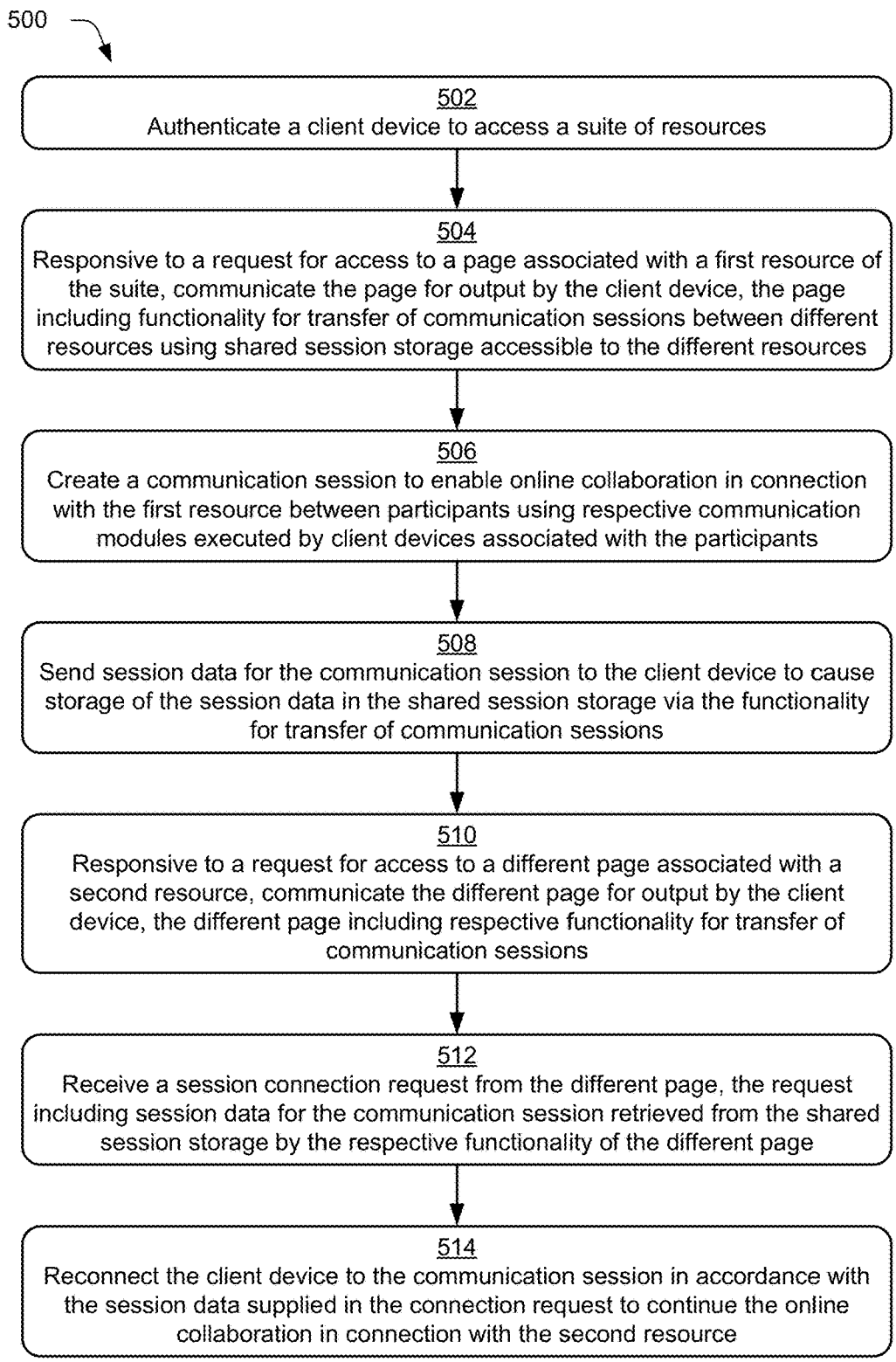
FIG. 5 is a flow diagram depicting an example procedure for a service to facilitate transfer of a communication session between resources in accordance with one or more implementations.

FIG. 5 is a flow diagram depicting an example procedure 500 for a service to facilitate transfer of a communication session between resources in accordance with one or more implementations. A client device authenticated to access a suite of resources available from one or more service providers (block 502). For example, a service provider 106 may include or make use of an authentication service to verify client credentials (e.g., a user name/password) to control access to various resource. In particular, the authentication service implements an authentication sequence using various protocols to determine that a user seeking access to resources is who they claim to be and/or are authorized to access the resources. Example authentication protocols that may be utilized include but are not limited to Kerberos, Active Directory Federation Services (ADFS), and Host Identity Protocol (HIP), to name a few. The authentication service verifies asserted credentials against credentials (e.g., user ID, password, key, shared secret, etc.) that are maintained in association with accounts as part of user account data. When the authentication is successful (e.g., the client "is who they say they are"), the authentication service may issue a token(s) (e.g., TGTs, encrypted blobs, cookies, and/or other suitable sign-on credentials) to enable access to corresponding resources.

A single authentication may correspond to one or more resources 124, such that authentication to a single account by a "single sign-on" may provide access to individual resources, resources from multiple service providers 106, and/or to an entire suite of resources available from a service provider 106. Thus, upon successful verification of the credentials, the client is logged-in to a user account and therefore may be given access to resources 124 authorized for the account. If the authentication service is unable to verify the credentials, access to the resources is denied, a prompt to retry authentication may be output, and so forth.

Responsive to a request for access to a page associated with a first resource of the suite, the page is communicated for output by the client device, the page including functionality for transfer of communication sessions between different resources using shared session storage accessible to the different resources (block 504). For example, a client can use a browser or other communication module 114 to interact with and navigate between various resources upon successful authentication. The service provider 106 may receive and process requests for resources communicated by the client in connection with the interaction. When a request for a particular resource and/or page is obtained, the service provider 106 provides data sufficient to enable the browser to the render the page. In accordance with techniques described herein, resources within a resource suite 126 and/or other resources available from a service provider(s) are configured with built-in functionality to support communication sessions. Additionally, the pages are configured to include or make use of a session transfer module 120 or comparable functionality to support techniques for transfer of a session/session data between different trusted resources.

A communication session is created to enable online collaboration in connection with the first resource between participants using respective communication modules executed by client devices associated with the participants (block 506). Then, session data for the communication session is sent to the client device to cause storage of the session data in the shared session storage via the functionality for transfer of communication sessions (block 508). For instance, a user may interact with functionality built-in to the page for the first resource to initiate or join a communication session. A request to establish the communication session between endpoints associated with multiple endpoints is formed and communicated to the communication service 128 to cause creation of the session. In response to such a request, the communication service 128 operates to create the session and generate corresponding session data 132, such a session ID, endpoint IDs, session links and other set-up parameters. The communication service 128 communicates session data 132 to client devices for endpoints to enable set-up of and connection to the session. The communication service 128 can additionally supply the client device with a trust list 134 indicating resources authorized to access the shared session storage. The trust list is usable by the client device to validate resources prior to transfer of session data between the resources. The trust list 134 can be communicated along with the session data 132 or via separate interactions that occur at different times.

As noted, the session data 132 and trust list 134 can be communicated to clients through interaction with code embedded with resources pages, such a session transfer module 120 that is implemented via an iframe or other suitable content container associated with a page. The embedded code operates to store session data in designated session storage (local or remote) to facilitate transfer between resources as described herein. Thus, code embedded in pages via iframes or otherwise is operable to effectuate storage and transfer of session data for the transfer of communication sessions using appropriate shared session storage.

Responsive to a request to access a different page associated with a second resource, the different page is communicated for output by the client device, the different page including respective functionality for transfer of communication session (block 510). Here, navigation to access a different page causes the service to provide data sufficient to enable output of the appropriate page by the client. The page for the second resource is also configured to support collaborations via communication sessions and transfers between resources. It is noted that navigation to access the different page associated with the second resource may cause a disconnection of the first resource from the communication session, since the browser is no longer directed to the first resource. Thus, when the different page is loaded, the browser performs operations to reconnect to the session. In one or more implementations, code within the page (e.g., session transfer module) is invoked to validate the resource as trusted using the trust list and retrieve session data for an active session if available in the session store 122.

If an existing session is available, the corresponding session data is used to form a request to reconnect to the session via the different page associated with a second resource. The request is communicated to the service to cause operations by the service to reestablish the connection. In particular, a session connection request is received from the different page associated with the second resource, the request including session data for the communication session retrieved from the shared session storage by the respective functionality of the different page (block 512). Then, the client device is reconnected to the communication session in accordance with the session data supplied in the connection request to continue the online collaboration in connection with the second resource (block 514). For example, the communication service 128 processes the session connection request and reconfigures the endpoint to correspond to the page associated with the second resource. In this way, the client is reconnected to the session via the second resource and the ongoing collaboration session is able to continue with little or no discernable disruption.

Having considered some example procedures, consider now a discussion of an example system and devices that may be employed to implement aspects of the techniques described herein in one or more implementations.

Example System and Device

Figure 6:
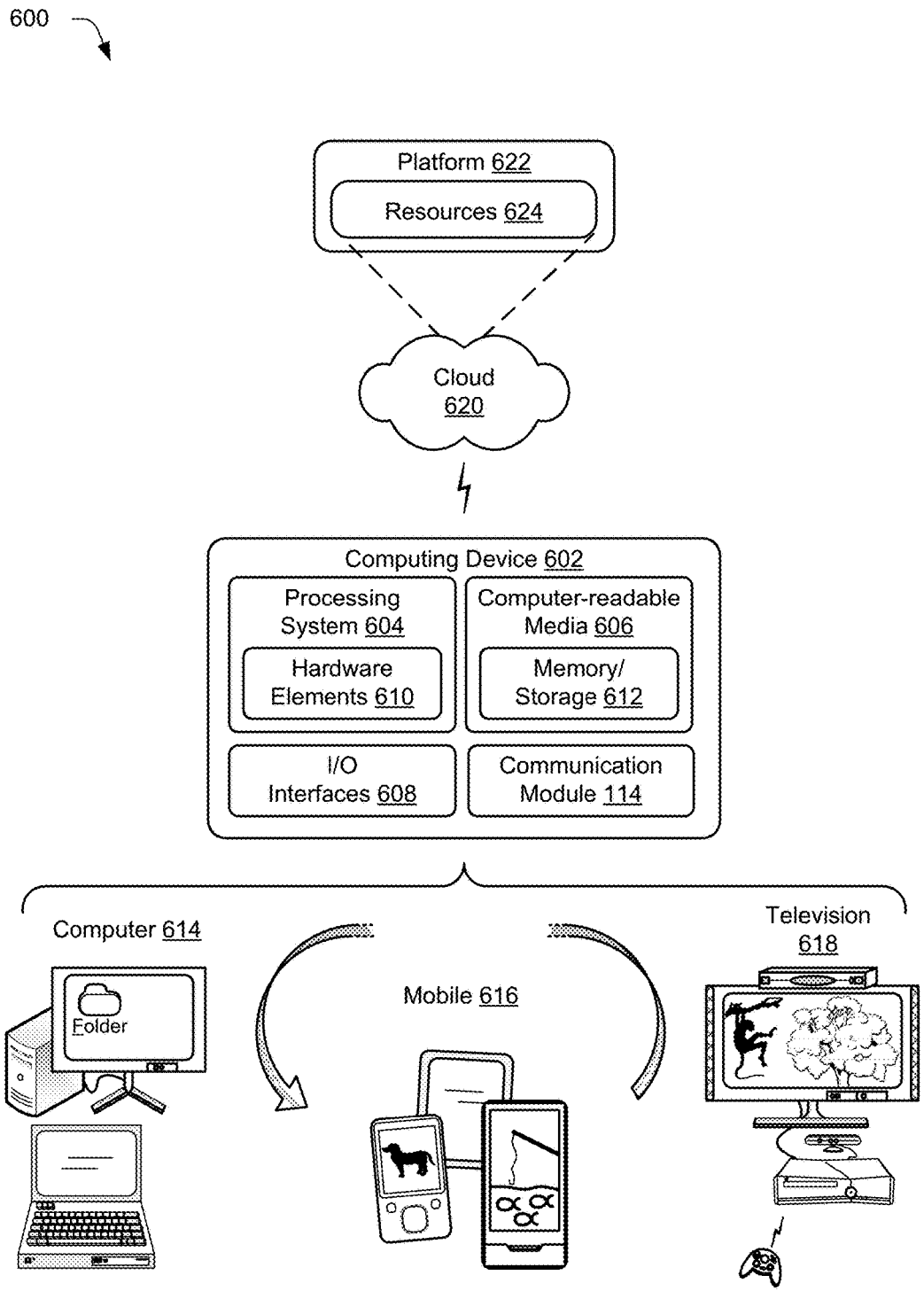
FIG. 6 illustrates an example system having devices and components that may be employed to implement aspects of the techniques described herein.

FIG. 6 illustrates an example system generally at 600 that includes an example computing device 602 that is representative of one or more computing systems and/or devices that may implement the various techniques described herein. The computing device 602 may be, for example, a server of a service provider, a device associated with the client (e.g., a client device), an on-chip system, and/or any other suitable computing device or computing system.

The example computing device 602 as illustrated includes a processing system 604, one or more computer-readable media 606, and one or more I/O interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "communication media."

"Computer-readable storage media" refers to media and/or devices that enable storage of information in contrast to mere signal transmission, carrier waves, or signals per se. Thus, computer-readable storage media does not include signal bearing media or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to a signal-bearing medium that is configured to transmit instructions to the hardware of the computing device 602, such as via a network. Communication media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including applications 112, communication module 114, session transfer module 120, communication service 128 and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules as a module that is executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 602 may assume a variety of different configurations, such as for computer 614, mobile 616, and television 618 uses. Each of these configurations includes devices that may have generally different constructs and capabilities, and thus the computing device 602 may be configured according to one or more of the different device classes. For instance, the computing device 602 may be implemented as the computer 614 class of a device that includes a personal computer, desktop computer, a multi-screen computer, laptop computer, netbook, and so on.

The computing device 602 may also be implemented as the mobile 616 class of device that includes mobile devices, such as a mobile phone, portable music player, portable gaming device, a tablet computer, a multi-screen computer, and so on. The computing device 602 may also be implemented as the television 618 class of device that includes devices having or connected to generally larger screens in casual viewing environments. These devices include televisions, set-top boxes, gaming consoles, and so on.

The techniques described herein may be supported by these various configurations of the computing device 602 and are not limited to the specific examples of the techniques described herein. This is illustrated through inclusion of the communication module 114 on the computing device 602. The functionality of the communication module 114 and other modules may also be implemented all or in part through use of a distributed system, such as over a "cloud" 620 via a platform 622 as described below.

The cloud 620 includes and/or is representative of a platform 622 for resources 624. The platform 622 abstracts underlying functionality of hardware (e.g., servers) and software resources of the cloud 620. The resources 624 may include applications and/or data that can be utilized while computer processing is executed on servers that are remote from the computing device 602. Resources 624 can also include services provided over the Internet and/or through a subscriber network, such as a cellular or Wi-Fi network.

The platform 622 may abstract resources and functions to connect the computing device 602 with other computing devices. The platform 622 may also serve to abstract scaling of resources to provide a corresponding level of scale to encountered demand for the resources 624 that are implemented via the platform 622. Accordingly, in an interconnected device embodiment, implementation of functionality described herein may be distributed throughout the system 600. For example, the functionality may be implemented in part on the computing device 602 as well as via the platform 622 that abstracts the functionality of the cloud 620.

Example Implementations

Example implementations of techniques described herein include, but are not limited to, one or any combinations of one or more of the following examples:

Example 1

A method implemented by a communication module executed via a computing device comprising: loading a page associated with a first application available from a service provider; initiating a communication session between multiple clients in conjunction with the loaded page; obtaining session data for the communication session via code embedded in the page; storing the session data in shared session storage exposed for use by authorized resources; upon navigation to a separate page associated with a second application, transferring the communication session to the separate page by: validating the separate page as a resource authorized to use the shared session storage via code embedded in the separate page; retrieving the session data from the shared session storage; and connecting to the communication session via the separate page using the session data that is retrieved from the shared session storage.

Example 2

A method as described in any one or more of the examples in this section 1, wherein the communication module comprises a browser application.

Example 3

A method as described in any one or more of the examples in this section, wherein the code embedded in the page is implemented via a frame for the page configured to access content from an external source that is different than a domain for the page.

Example 4

A method as described in any one or more of the examples in this section, wherein the session data comprises parameters used to setup the communication session via a communication service including one or more of a user identifier, session identifier, identification of client endpoints for the communication session, a session URL, or session security credentials.

Example 5

A method as described in any one or more of the examples in this section, wherein both of the first application and second application: support collaboration functionality in conjunction with application functionality provided by said applications through communication sessions established via a communication service; and are included in a group of trusted resources authorized to use the shared session storage.

Example 6

A method as described in any one or more of the examples in this section, wherein the shared session storage is implemented via local storage associated with the computing device.

Example 7

A method as described in any one or more of the examples in this section, wherein the shared session storage is implemented via remote storage that enables roaming of the session data between different devices authenticated to an account authorized to access the remote storage.

Example 8

A method as described in any one or more of the examples in this section, wherein validating the separate page includes ascertaining whether the separate page is included in a trust list that specifies trusted resources authorized to use the shared session storage.

Example 9

A method as described in any one or more of the examples in this section, wherein transferring the communication session includes controlling access to the session data stored in the shared session storage based on authentication of the computing device to a user account associated with the session data.

Example 10

A method as described in any one or more of the examples in this section, wherein the first application and the second application are included in a suite of multiple resources provided by the service provider, the multiple resources implemented via different domains and corresponding pages that are separate and distinct for different resources.

Example 11

A method as described in any one or more of the examples in this section 1, wherein the communication session comprises a web-based real time communication session that supports the exchange of real-time audio and video streams between participants via respective communication modules executed by client devices associated with the participants.

Example 12

A method as described in any one or more of the examples in this section, wherein the communication session comprises an instant messaging session that supports the exchange of instant messages between participants via respective communication modules executed by client devices associated with the participants.

Example 13

A computing device comprising: a processing system; storage configured to implement a shared session store to facilitate transfer between different resources of session data for communication sessions established via a communication service; and one or more computer readable media storing instructions that, when executed by the processing system, implement a communication module configured to perform operations comprising: storing in the shared session store session data obtained in connection with communication sessions engaged in via pages for different resources rendered by the communication module; responsive to navigation between different pages associated with different resources: determining authorizations of the different resources to utilize the shared session store; and when the navigation occurs between authorized resources, maintaining communication sessions that are active across corresponding page reloads for the authorized resources by: retrieving session data for the communication sessions from the shared session store; and passing the session data that is retrieved to the communication service to reconnect to the communication sessions after navigation occurs.

Example 14

The computing device of any one or more of the examples in this section, wherein determining the authorizations comprises checking resources against a trust list configured to distinguish between resources that authorized and not authorized to access the shared session store.

Example 15

The computing device of any one or more of the examples in this section, wherein the communication module is configured to perform the operations by invoking session transfer modules embedded in iframes of pages for the different resources.

Example 16

The computing device of any one or more of the examples in this section, further comprising allowing disconnection from communications sessions to occur when the navigation involves one or more resources that are not authorized.

Example 17

A computing system comprising: a processing system having one or more hardware devices; one or more modules that, when executed by the processing system, cause the computing system to perform operations comprising: authenticating a client device to access a suite of resources available from one or more service providers; responsive to a request for access to a page associated with a first resource of the suite, communicating the page for output by the client device, the page including functionality for transfer of communication sessions between different resources using shared session storage accessible to the different resources; creating a communication session to enable online collaboration in connection with the first resource between participants using respective communication modules executed by client devices associated with the participants; sending session data for the communication session to the client device to cause storage of the session data in the shared session storage via the functionality for transfer of communication sessions; responsive to a request to access a different page associated with a second resource, communicating the different page for output by the client device, the different page including respective functionality for transfer of communication sessions; receiving a session connection request from the different page associated with the second resource, the request including session data for the communication session retrieved from the shared session storage by the respective functionality of the different page; and reconnecting the client device to the communication session in accordance with the session data supplied in the connection request to continue the online collaboration in connection with the second resource.

Example 18

A computing system as recited in any one or more of the examples in this section, wherein the functionality for transfer of communication sessions included with the page and the different page comprises code embedded in iframes of said pages to effectuate storage and transfer of session data for the transfer of communication sessions using the shared session storage.

Example 19

A computing system as recited in any one or more of the examples in this section, wherein navigation to access the different page associated with the second resource causes a disconnection of the first resource from the communication session.

Example 20

A computing system as recited in any one or more of the examples in this section, wherein the operations further comprise supplying the client device with a trust list indicating resources authorized to access the shared session storage, the trust list usable by the client device to validate resources prior to transfer of session data between the resources.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claimed subject matter.

What is claimed is:
1. A method implemented by a computing device, the method comprising:
loading a first page associated with a first resource, the first resource including a first main functionality and an associated first communication functionality;
initiating a communication session between the computing device and at least one client device in conjunction with the first communication functionality of the loaded first page, the communication session being associated with a user account;
obtaining session data for the communication session, the session data including one or more parameters useable to initiate the communication session using the first communication functionality;
storing the session data;
upon navigation to a second page associated with a second resource that is different from the first resource, the second resource including a second main functionality different from the first main functionality and an associated second communication functionality, separate from the first communication functionality, maintaining the communication session at the second page by:

validating the second resource as a resource authorized to access the session data for the communication session from shared session storage, wherein the validating includes determining that the computing device is signed in to the user account;
accessing, through the second page, the stored session data; and
connecting to the communication session via the second communication functionality associated with second page using the accessed session data.

2. A method as described in claim 1, wherein the first page is associated with a first source and the second page is associated with a second source that is different from the first source.

3. A method as described in claim 1, wherein the session data for the communication session is obtained via code embedded in the first page, the embedded code being implemented via an in-line frame (iframe) for the first page, the iframe configured to access content from an external source that is different from a source associated with the first page.

4. A method as described in claim 1, wherein the session data comprises parameters used to setup the communication session via a communication service include one or more of a user identifier, a session identifier, an identification of client endpoints for the communication session, a session URL, or session security credentials.

5. A method as described in claim 1, wherein the shared session storage is implemented via local storage at the computing device.

6. A method as described in claim 1, wherein the shared session storage is implemented via remote storage that enables roaming of the session data between different devices authenticated to the user account.

7. A method as described in claim 1, wherein validating the second page includes ascertaining whether the second page is included in a trust list that specifies trusted resources authorized to use the shared session storage.

8. A computing device comprising:
a processing system; and
one or more computer readable media storing instructions that, when executed by the processing system, cause the computing device to perform operations comprising:
storing, in a shared session store, session data for a communication session between the computing device and at least one client device, the communication session associated with a user account and initiated via a first communication functionality associated with a first page that is associated with a first resource; and
responsive to detecting a navigation from the first page to a second page, associated with a second resource that is different from the first resource, the second page being associated with a second communication functionality, separate from the first communication functionality:
maintaining the communication session by:
validating the second resource as a resource authorized to access the session data for the communication session from the shared session store, wherein the validating includes determining that the computing device is signed in to the user account;
retrieving the session data from the shared session store; and
communicating the retrieved session data for use by the second communication functionality associated with the second page to maintain the communication session.

9. The computing device of claim 8, the computing device further comprising local storage configured to implement the shared session store and facilitate transfer of the session data between different pages.

10. The computing device of claim 8, wherein the shared session store is implemented at a storage location that is remote from the computing device.

11. The computing device of claim 8, wherein maintaining the communication session is further performed by determining authorizations of the second page to access the shared session store via a trust list configured to distinguish between authorized and unauthorized pages for accessing the shared session store.

12. The computing device of claim 8, wherein storing the session data and maintaining the communication session is performed using code embedded in iframes of the first and second pages.

13. The computing device of claim 8, further comprising disconnecting from the communication session in response to determining that the second page is not authorized to access the shared session store.

14. A computing system comprising:
a processing system having one or more hardware devices; and
one or more computer readable media storing instructions that, when executed by the processing system, cause the computing system to perform operations comprising:
communicating a first page associated with a first resource for output by a client device, the first page including a display area for a first communication functionality associated with the first resource;
creating the communication session using the first communication functionality to enable online collaboration between the client device and at least one computing device in connection with the first page, the communication session being associated with a user account;
causing storage of session data for the communication session at a shared session store by communicating the session data to the shared session store;
receiving a request from the client device to navigate from the first page to a second page associated with a second resource that is different from the first resource; and
responsive to receiving the request:
communicating the second page for output by the client device, the second page including a display area for a second communication functionality associated with the second page and separate from the first communication functionality; and
maintaining the communication session by:
validating the second resource as a resource authorized to access the session data from the shared session store, wherein the validating includes determining that the computing device is signed in to the user account; and
retrieving the session data from the shared session store and communicating the retrieved session data for use by the second communication functionality associated with the second page to maintain the communication session.

15. A computing system as recited in claim 14, wherein the shared session store is implemented in storage of the client device.

16. A computing system as recited in claim 14, wherein the shared session store is implemented at a storage location that is remote from the client device.

17. A computing system as recited in claim 14, wherein the display areas of the first and second pages are each configured as an iframe to effectuate storage and transfer of session data for the maintaining of the communication session via the shared session store.

18. A computing system as recited in claim 14, the operations further comprising disconnecting a connection between the first communication functionality and the first resource responsive to receiving the request.

19. A computing system as recited in claim 14, the operations further comprising communicating a trust list to the client device responsive to receiving the request, the trust list including information describing one or more resources authorized to access the shared session store, the trust list being useable to validate pages prior to transfer of session data between the first and second pages.

* * * * *